(12) United States Patent
Okawara (10) Patent No.: US 7,560,079 B2
(45) Date of Patent: Jul. 14, 2009

(54) EXHAUST GAS-PURIFYING APPARATUS

(75) Inventor: Seiji Okawara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 393 days.

(21) Appl. No.: 10/922,948

(22) Filed: Aug. 23, 2004

(65) Prior Publication Data

US 2005/0175515 A1 Aug. 11, 2005

(30) Foreign Application Priority Data

Aug. 27, 2003 (JP) .............................. 2003-303282

(51) Int. Cl.
 *B01D 50/00* (2006.01)
 *B01D 53/34* (2006.01)
 *F01N 3/00* (2006.01)
 *F23J 11/00* (2006.01)
(52) U.S. Cl. .................. 422/180; 422/168; 422/169; 422/170
(58) Field of Classification Search ............. 422/180, 422/168, 169, 170
See application file for complete search history.

(56) References Cited

U.S. PATENT DOCUMENTS

| | | | | |
|---|---|---|---|---|
| 4,116,881 A | * | 9/1978 | Shibata et al. | ............... 502/401 |
| 5,945,627 A | * | 8/1999 | Arpin et al. | ............ 102/202.11 |
| 6,314,722 B1 | * | 11/2001 | Matros et al. | ................. 60/274 |
| 6,367,246 B1 | * | 4/2002 | Hirota et al. | ................. 60/295 |
| 2002/0053202 A1 | | 5/2002 | Akama et al. | |
| 2002/0081238 A1 | | 6/2002 | Duvinage et al. | |
| 2003/0115859 A1 | * | 6/2003 | Deeba | ......................... 60/297 |
| 2004/0116276 A1 | * | 6/2004 | Yezerets et al. | ............... 502/34 |

FOREIGN PATENT DOCUMENTS

| | | |
|---|---|---|
| DE | 199 21 974 A1 | 11/2000 |
| EP | 1 072 763 A1 | 1/2001 |
| EP | 1 152 140 A2 | 11/2001 |
| EP | 1 164 268 A2 | 12/2001 |
| JP | 06-159037 | 6/1994 |
| JP | 09-053442 | 2/1997 |

(Continued)

OTHER PUBLICATIONS

English Translation of JP2002-349341 Abstract.*
Certified Translation of JP-2002-129950 (Jun. 2007).*

*Primary Examiner*—Alexa D Neckel
*Assistant Examiner*—Matthew J Merkling
(74) *Attorney, Agent, or Firm*—Finnegan, Henderson, Farabow, Garrett & Dunner, LLP (57) ABSTRACT

An exhaust gas-purifying apparatus includes an $NO_x$ sorbing-and-reducing first catalyst, a filter second catalyst, and an $NO_x$ sorbing-and-reducing third catalyst, which are disposed in an exhaust system in this order from a downstream side to an upstream side of a flow of exhaust gases. In the exhaust system, a liquid reducing agent is supplied into the exhaust gases intermittently. The first catalyst exhibits a remarkably high $NO_x$ purifying ability, because not only the third catalyst and the second catalyst gasify, crack and homogenize the reducing gas fully but also the reactions at the third and second catalysts elevate the temperature of exhaust gases. Thus, the exhaust gas-purifying apparatus can purify PMs and $NO_x$ efficiently.

6 Claims, 3 Drawing Sheets

FOREIGN PATENT DOCUMENTS

| | | |
|---|---|---|
| JP | 09-173866 | 7/1997 |
| JP | 2000-204940 | 7/2000 |
| JP | 2001-187344 | 7/2001 |
| JP | 2002-115524 | 4/2002 |
| JP | 2002-153733 | 5/2002 |
| JP | 2002129950 A * | 5/2002 |
| JP | 2002-295243 | 10/2002 |
| JP | 2002-364338 | 12/2002 |
| JP | 2003-205245 | 7/2003 |
| WO | WO 0196717 A1 | 12/2001 |
| WO | WO 03/068364 A1 | 8/2003 |
| WO | WO 2004/079170 A1 | 9/2004 |

* cited by examiner

EXHAUST GAS-PURIFYING APPARATUS

BACKGROUND OF THE INVENTION

1. Field of the Invention

The present invention relates to an exhaust gas-purifying apparatus for purifying exhaust gases including particulates, such as those emitted from diesel engines. More particularly, it relates to an exhaust gas-purifying apparatus used in exhaust systems in which a liquid reducing agent is supplied into the exhaust gases intermittently.

2. Description of the Related Art

Regarding gasoline engines, harmful components in the exhaust gases have been reduced securely by the strict regulations on the exhaust gases and the technological developments capable of coping with the strict regulations. However, regarding diesel engines, the regulations and the technological developments have been advanced less compared to those of gasoline engines because of the unique circumstances that the harmful components are emitted as particulates (i.e., particulate matters, such as carbonaceous fine particles, sulfuric fine particles like sulfates, and high-molecular-weight hydrocarbon fine particles, hereinafter collectively referred to as "PMs").

As exhaust gas-purifying apparatuses having been developed so far for diesel engines, the following have been known. For example, the exhaust gas-purifying apparatuses can be roughly divided into trapping (or wall-flow) exhaust gas-purifying apparatuses and open (or straight-flow) exhaust gas-purifying apparatuses. Among these, clogged honeycomb structures made from ceramic (i.e., diesel PMs filters, hereinafter referred to as "DPFs") have been known as one of the trapping exhaust gas-purifying apparatuses. In the DPFs, the honeycomb structures are clogged at the opposite openings of cells in a checkered manner alternately, for instance. The DPFs comprise inlet cells clogged on the downstream side of the flow of exhaust gases, outlet cells neighboring the inlet cells and clogged on the upstream side of the flow of the exhaust gases, and cellular walls demarcating the inlet cells and the outlet cells. The DPFs inhibit the emission of PMs by filtering the exhaust gases with the pores of the cellular walls to collect PMs.

The pressure loss, however, increases as PMs deposit on the DPFs. Accordingly, it is needed to regularly remove deposited PMs to recover the DPFs by certain means. Hence, when the pressure loss increases, deposited PMs have been burned with burners or electric heaters conventionally, thereby recovering the DPFs. However, in this case, the greater the deposition of PMs is, the higher the temperature increases in burning deposited PMs. Consequently, there might arise cases that the DPFs are damaged by thermal stress resulting from such burning.

Hence, continuously regenerative DPFs have been developed recently. For example, in one of the continuously regenerative DPFs, a coating layer comprising alumina is formed on the surface of the cellular walls of the DPF, and a catalytic ingredient such as platinum (Pt) is loaded on the coating layer. In accordance with the continuously regenerative DPFs, since the collected PMs are oxidized and burned by the catalytic reaction of the catalytic ingredient, it is possible to regenerate the DPFs by burning PMs simultaneously with or successively after collecting PMs. Moreover, since the catalytic reaction occurs at relatively low temperatures, and since PMs can be burned when they are collected less, the continuously regenerative DPFs produce an advantage that the thermal stress affecting the DPFs is so less that the DPFs are inhibited from being damaged.

Japanese Unexamined Patent Publication (KOKAI) No. 9-173,866 discloses such a filter catalyst. For example, the filter catalyst is made by forming a porous coating layer composed of first activated alumina whose particle diameter is larger than an average pore diameter of pores in the cellular walls, coating the inside of the pores with second activated alumina whose particle diameter is smaller than an average pore diameter of the pores, and further loading a catalytic ingredient thereon. In accordance with the filter catalyst, it is possible to make the pressure loss lower while enlarging the specific surface area of the porous coating layer.

Moreover, Japanese Unexamined Patent Publication (KOKAI) No. 6-159,037 discloses a filter catalyst which is made by further loading an $NO_x$ sorbing member on the porous coating layer. Thus, the $NO_x$ sorbing member sorbs $NO_x$ therein so that it becomes possible to purify the sorbed $NO_x$ by reduction by spraying a reducing agent, such as light oil.

However, in filter catalysts provided with a coating layer on which a catalytic ingredient and an $NO_x$ sorbing member are loaded, the forming amount of the coating layer is limited in view of making the pressure loss lower. Accordingly, the loading amount of the catalytic ingredient should be made less inevitably, because the catalytic ingredient should be loaded in such a highly dispersed manner in order to suppress the granular growth at high temperatures. Consequently, there arises a problem that the resulting filter catalysts might lack the PMs and $NO_x$ purifying performance. Moreover, in the case that low-temperature exhaust gases keep flowing into the filter catalysts, the resultant filter catalysts might suffer from the problem of the enlarged pressure loss, because they might exhibit such a low PMs oxidizing activity that PMs deposit in a large amount to clog the cells.

Hence, Japanese Patent Application No. 2001-212,506 (now published as Japanese Unexamined Patent Publication (KOKAI) No. 2002-115,524), Japanese Unexamined Patent Publication (KOKAI) No. 9-53,442 and Japanese Patent Application No. 11-5,285 (now published as Japanese Unexamined Patent Publication (KOKAI) No. 2000-204,940) disclose exhaust gas-purifying apparatuses in which a straight-flow structure oxidizing catalyst or $NO_x$ sorbing-and-reducing catalyst and a filter catalyst are disposed in series. When a straight-flow structure catalyst is used with a filter catalyst in combination, it is possible to improve the purifying performance of the resulting exhaust gas-purifying apparatus without enlarging the pressure loss. Moreover, when such a straight-flow structure catalyst is disposed on an upstream side of the flow of exhaust gases with respect to a filter catalyst, it is possible not only to upgrade the PMs oxidizing performance of the resultant exhaust gas-purifying apparatus, but also to suppress the increment of the pressure loss due to the clogging, because the purifying reaction of the upstream-side straight-flow structure catalyst increases the temperature of exhaust gases.

Incidentally, a system has been proposed in which a liquid reducing agent, such as light oil, is supplied into exhaust gases intermittently as a reducing agent in order to improve the $NO_x$ reducing activity, and is about to come into practical use. However, when the above-described exhaust gas-purifying apparatus, which comprises a straight-flow structure oxidizing catalyst or $NO_x$ sorbing-and-reducing catalyst and a filter catalyst disposed in series, is applied to the system, the liquid reducing agent flows directly into one of the catalysts disposed on the most upstream side of the flow of exhaust gases. As a result, a drawback might arise in that the most-upstream-side catalyst cannot demonstrate the catalytic activity fully and accordingly the considerable amount of the catalytic ingredient loaded thereon has been wasted.

SUMMARY OF THE INVENTION

The present exhaust gas-purifying apparatus can purify PMs and $NO_x$ efficiently, because it promotes the activity of liquid reducing agents so effectively as to utilize it for the purification of PMs and $NO_x$.

An exhaust gas-purifying apparatus according to the present invention, used in an exhaust system in which a liquid reducing agent is supplied into exhaust gases intermittently, comprises:

an $NO_x$ sorbing-and-reducing first catalyst disposed on a downstream side of a flow of the exhaust gases, comprising
  a straight-flow structure support substrate having cells and cellular walls demarcating the cells, and
  a catalytic layer formed on a surface of the cellular walls, and including a catalytic ingredient and an $NO_x$ sorbing member loaded thereon;
a second catalyst disposed on an upstream side of the flow of the exhaust gases with respect to the first catalyst, comprising
  a wall-flow structure honeycomb substrate having
    inlet cells clogged on a downstream side of the flow of the exhaust gases,
    outlet cells neighboring the inlet cells and clogged on an upstream side of the flow of the exhaust gases, and
    porous cellular walls demarcating the inlet cells and the outlet cells and having pores, and
  a catalytic layer formed on a surface of the cellular walls and an inner surface of the pores and including an oxide support and a catalytic ingredient loaded on the oxide support; and
an $NO_x$ sorbing-and-reducing third catalyst disposed on an upstream side of the flow of the exhaust gases with respect to the second catalyst, comprising
  a straight-flow structure support substrate having cells and cellular walls demarcating the cells, and
  a catalytic layer formed on a surface of the cellular walls and including a catalytic ingredient and an $NO_x$ sorbing member loaded thereon.

The second catalyst can desirably further comprise an $NO_x$ sorbing member loaded on the catalytic layer. Further, the present exhaust gas-purifying apparatus can desirably further comprise an oxidizing catalyst comprising
  a straight-flow structure support substrate having cells and cellular walls demarcating the cells, and
  a catalytic layer formed on a surface of the cellular walls and including a catalytic ingredient loaded thereon,
  wherein the oxidizing catalyst is disposed on an upstream side of the flow of the exhaust gases with respect to the third catalyst.

Furthermore, the first catalyst can preferably exhibit a loading density of the catalytic ingredient higher than that of the third catalyst. Moreover, the third catalyst can preferably exhibit a loading density of the $NO_x$ sorbing member higher than that of the first catalyst. In addition, the first catalyst and the third catalyst can preferably exhibit a catalytic layer coating amount greater than that of the second catalyst.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present exhaust gas-purifying apparatus comprises an $NO_x$ sorbing-and-reducing first catalyst, a second catalyst (i.e., a so-called filter catalyst), and an $NO_x$ sorbing-and-reducing third catalyst which are disposed from a downstream side to an upstream side of the flow of exhaust gases in this order.

When fuel-lean atmosphere exhaust gases containing oxygen excessively and emitted from diesel engines under ordinary operations flow into the present exhaust gas-purifying apparatus, the HC and CO in the exhaust gases are purified by oxidation at the third catalyst, the second catalyst and the first catalyst. Further, NO in the exhaust gases is also oxidized at the third catalyst, the second catalyst and the first catalyst, and is turned into $NO_2$. The resulting $NO_2$ is sorbed first in the $NO_x$ sorbing member of the third catalyst. Furthermore, $NO_x$ which have passed through the third catalyst are sorbed in the $NO_x$ sorbing member of the first catalyst. Moreover, when an $NO_x$ sorbing member is loaded on the catalytic layer of the second catalyst, $NO_x$ are sorbed at the second catalyst as well.

In addition, the PMs in the exhaust gases are trapped onto the second catalyst, and are purified by oxidation by the catalytic ingredient loaded on the catalytic layer of the second catalyst. Here, note that, when an $NO_x$ sorbing member is further loaded on the catalytic layer of the second catalyst, the reaction of purifying PMs is furthermore promoted because the PMs are furthermore oxidized by active oxygen generated in the reaction in which NO is turned into $NO_2$ and is sorbed in the $NO_x$ sorbing member therethrough.

When a liquid reducing agent is supplied into the exhaust gases, the liquid reducing agent is oxidized at the third catalyst, and the sorbed $NO_x$ are reduced to NO or $N_2$. Accompanied by the reducing reactions, active species for oxidizing PMs, such as active oxygen, generate, and flow into the second catalyst. Accordingly, the active species purify the PMs trapped onto the second catalyst by oxidation, and simultaneously NO is reduced at the second catalyst. When an $NO_x$ sorbing member is loaded on the catalytic layer of the second catalyst, the $NO_x$ sorbed by the $NO_x$ sorbing member are reduced at the second catalyst as well, and simultaneously active species for oxidizing PMs are generated. Consequently, the reaction of purifying PMs is furthermore promoted.

Moreover, the liquid reducing agent is fully gasified, cracked and homogenized at the third catalyst and the second catalyst. In addition, the resulting gasified, cracked and homogenized reducing agents reduce $NO_x$, which have passed through the second catalyst, as well as $NO_x$, which are sorbed in the first catalyst, efficiently and fully at the first catalyst, because the PMs oxidation reaction and the HC partial oxidation reaction increase the temperature of the exhaust gases.

Figure 1:
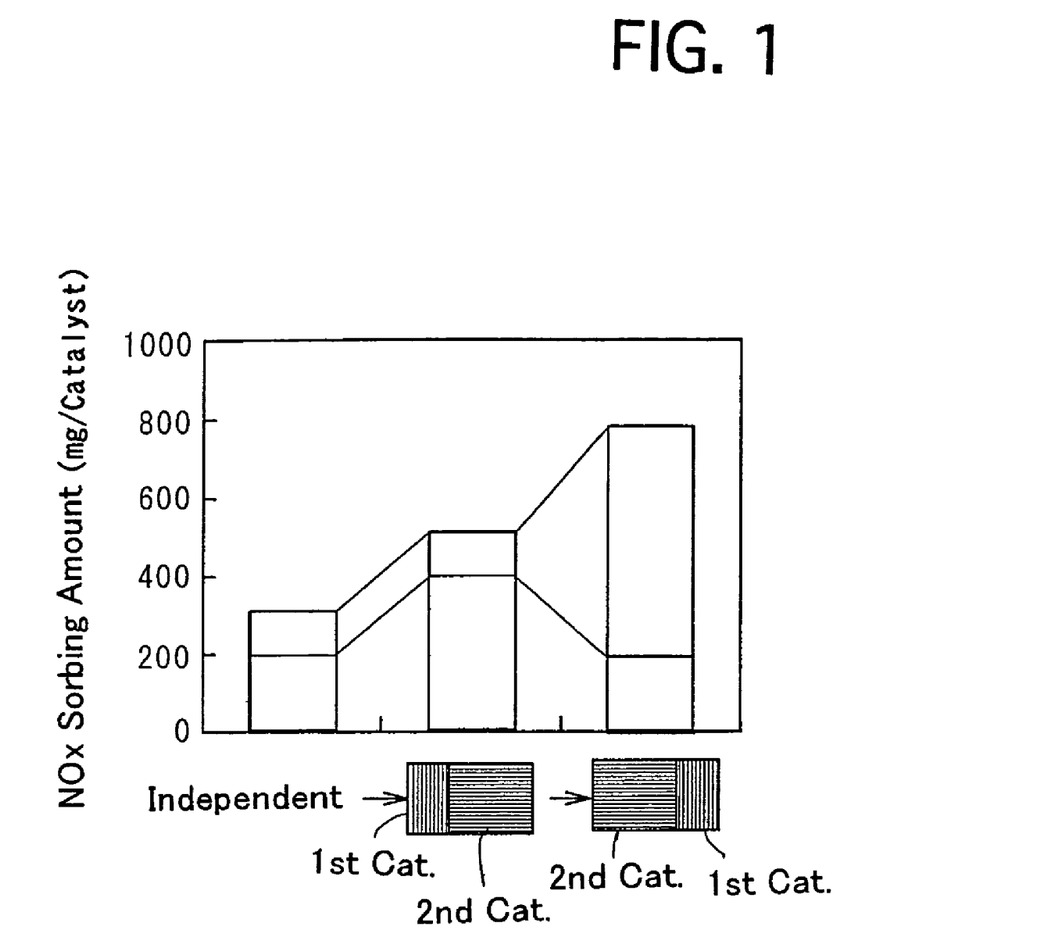
FIG. 1 is a graph for illustrating relationships between the dispositions of catalysts and the $NO_x$ sorbing amount.

The present inventor investigated the variation in $NO_x$ sorbing amounts, which were exhibited by combinations of a straight-flow structure first catalyst and a wall-flow structure second catalyst whose dispositions were changed variously, when the atmosphere of exhaust gases was changed to fuel-lean after a liquid reducing agent was supplied into the exhaust gases. FIG. 1 illustrates the results of the investigation. The left-end bar graph specifies a simple sum of the $NO_x$ sorbing amount, which was exhibited by the first catalyst, and the $NO_x$ sorbing amount, which was exhibited by the second catalyst comprising a catalytic layer with an $NO_x$ sorbing member loaded thereon, when the first catalyst and the second catalyst were used independently. The middle bar graph specifies an overall $NO_x$ sorbing amount, which was exhibited when the second catalyst comprising a catalytic layer with an $NO_x$ sorbing member loaded thereon was disposed on a downstream side of the flow of exhaust gases with respect to the first catalyst. The right-end bar graph specifies an overall $NO_x$ sorbing amount, which was exhibited when the first catalyst was disposed on a downstream side of the flow of exhaust gases with respect to the second catalyst comprising a catalytic layer with an $NO_x$ sorbing member loaded thereon.

Note that the upper part of the left-end bar graph designates the $NO_x$ sorbing amount, which was exhibited by the first catalyst independently, and the lower part thereof designates the $NO_x$ sorbing amount, which was exhibited by the second catalyst independently. The upper part of the middle and right-end bar graphs designates the $NO_x$ sorbing amount, which could be attributed to the first catalyst, and the lower part thereof designates the $NO_x$ sorbing amount, which could be attributed to the second catalyst.

From FIG. 1, it is understood that, when the second catalyst comprising a catalytic layer with an $NO_x$ sorbing member loaded thereon was disposed on a downstream side of the flow of exhaust gases with respect to the first catalyst, not only the overall $NO_x$ sorbing amount enlarged more than the simple sum of the $NO_x$ sorbing amounts exhibited by the independent first and second catalysts, but also the overall $NO_x$ sorbing amount exhibited by the downstream-side second catalyst enlarged. Moreover, the following are appreciated. Regardless of the fact that the loading amounts of catalytic ingredient and $NO_x$ sorbing member were the same, the right-end disposition, in which the straight-flow structure first catalyst was disposed reversely on a downstream side of the flow of exhaust gases with respect to the wall-flow structure second catalyst, exhibited a much higher $NO_x$ sorbing amount than that exhibited by the middle disposition, in which the wall-flow structure second catalyst was disposed on a downstream side of the flow of exhaust gases with respect to the straight-flow structure first catalyst, and the straight-flow first catalyst exhibited a sharply increased $NO_x$ sorbing amount.

That is, when a straight-flow structure $NO_x$ sorbing-and-reducing catalyst is disposed on a downstream side of the flow of exhaust gases with respect to a filter catalyst, the $NO_x$ sorbing amount augments sharply. The advantage results from the fact that the reaction efficiency between highly active reducing agents and $NO_x$ is enhanced remarkably at the downstream-side straight-flow structure $NO_x$ sorbing-and-reducing catalyst of good $NO_x$ sorbing ability, because reducing agents flow into the downstream-side straight-flow structure $NO_x$ sorbing-and-reducing catalyst after being activated at the upstream-side filter catalyst. Therefore, most of the $NO_x$ sorbed in the downstream-side straight-flow structure $NO_x$ sorbing-and-reducing catalyst have been reduced, and accordingly the $NO_x$ sorbing member of the downstream-side straight-flow structure $NO_x$ sorbing-and-reducing catalyst can sorb more $NO_x$ in fuel-lean atmospheres. Note that straight-flow structure $NO_x$ sorbing-and-reducing catalysts exhibit a higher $NO_x$ purifying ability than that of filter catalysts in general, because it is possible to form the catalytic layer in a greater amount in straight-flow structure $NO_x$ sorbing-and-reducing catalysts than in filter catalysts so that catalytic ingredients and $NO_x$ sorbing members can be loaded more on the catalytic layer.

Moreover, when the straight-flow structure third catalyst is further disposed on an upstream side of the flow of exhaust gases with respect to the filter catalyst, the NO oxidizing ability, $NO_x$ sorbing ability and HC and CO oxidizing ability of the present exhaust gas-purifying apparatus are furthermore enhanced, and simultaneously the present exhaust gas-purifying apparatus furthermore promotes to gasify, crack and homogenize reducing agents. Therefore, the present exhaust gas-purifying apparatus can purify HC, CO, $NO_x$ and PMs in exhaust gases efficiently, and can also suppress the pressure loss from increasing.

The first catalyst and the third catalyst are $NO_x$ sorbing-and-reducing catalysts which comprise a straight-flow structure support substrate and a catalytic layer formed on a surface of the cellular walls of the support substrate and including a catalytic ingredient and an $NO_x$ sorbing member loaded thereon. It is possible to use conventional $NO_x$ sorbing-and-reducing catalysts for the first and third catalysts as they are. The catalytic layer comprises an oxide powder such as alumina, ceria, zirconia and titania, and a catalytic ingredient and an $NO_x$ sorbing member loaded on the oxide powder. Note that the oxide powder can preferably be formed as a layer in an amount of from 150 to 300 g with respect to 1 L of the straight-flow structure support substrate.

As for the catalytic ingredient included in the first and third catalysts, it is possible to use at least one noble metal selected from the group consisting of Pt, Rh and Pd. The catalytic ingredient can preferably be loaded in an amount of from 0.1 to 10 g with respect to 1 L of the straight-flow structure support substrate. As for the $NO_x$ sorbing member, it is possible to use at least one member selected from the group consisting of alkali metals, alkaline-earth metals and rare-earth elements. The $NO_x$ sorbing member can preferably be loaded as oxide or carbonate in an amount of from 0.01 to 2 mol with respect to 1 L of the straight-flow structure support substrate.

The second catalyst comprises a wall-flow structure honeycomb substrate and a catalytic layer formed on a surface of the cellular walls of the wall-flow structure honeycomb substrate and an inner surface of the pores of the cellular walls, and including an oxide support and a catalytic ingredient loaded on the oxide support.

The wall-flow structure honeycomb substrate comprises inlet cells clogged on a downstream side of the flow of exhaust gases, outlet cells neighboring the inlet cells and clogged on an upstream side of the flow of the exhaust gases, and cellular walls demarcating the inlet cells and the outlet cells and having pores. The wall-flow structure honeycomb substrate can be made from heat-resistant ceramics, such as cordierite and silicon carbide. For example, the wall-flow structure honeycomb substrate can be produced in the following manner. A clayey slurry whose major component is a cordierite powder is prepared, and is formed as a honeycomb shape by extrusion. The resulting honeycomb-shaped formed workpiece is calcined. Instead of the cordierite powder, it is possible to use an alumina powder, a magnesia powder and a silica powder which are compounded to make the cordierite composition. Then, the honeycomb-shaped formed workpiece is clogged with a clayey slurry, a so-called clogging member, at some of the opposite-end cellular openings in a checkered manner, and is clogged with the clogging member at the other opposite-end cellular openings neighboring the clogged opposite-end cellular openings. Finally, the thus clogged honeycomb-shaped formed workpiece is calcined to fasten the clogging member, thereby completing the wall-flow structure honeycomb substrate.

The pores can be formed in the cellular walls of the honeycomb-shaped formed workpiece as hereinafter described. For instance, a combustible powder, such as carbon powders, wood powders, starch and resinous powders, is mixed into the aforementioned slurry. When the honeycomb-shaped formed workpiece is calcined, the combustible powder disappears to form the pores. Moreover, it is possible to control the pore diameter distribution and opening area of the superficial pores and inner pores in the cellular walls by controlling the particle diameter and addition amount of the combustible powder.

On a surface of the cellular walls and an inner surface of the pores, a catalytic layer is formed, which comprises an oxide support and a catalytic ingredient loaded on the oxide support. As for the oxide support, it is possible to use oxides, such as alumina, ceria, zirconia and titania, and composite oxides composed of a plurality of them. As for the catalytic ingredient, it is preferable to use one or more members selected from platinum-group elements, such as Pt, Rh, Pd, Ir and Ru. The loading amount of the catalytic ingredient can preferably fall in a range of from 0.1 to 5 g with respect to 1 L of the wall-flow structure honeycomb substrate. When the loading amount is less than 0.1 g with respect to 1 L of the wall-flow structure honeycomb substrate, the purifying activities of the resulting catalytic layers are too low to be practical. When the catalytic ingredient is loaded more than 5 g with respect to 1 L of the wall-flow structure honeycomb substrate, the purifying activities of the resulting catalytic layers have saturated, and at the same time the material cost has gone up.

The catalytic layer can desirably further comprise at least one $NO_x$ sorbing member selected from the group consisting of alkali metals, alkaline-earth metals and rare-earth elements. When the catalytic layer further comprises an $NO_x$ sorbing member, it is possible to sorb $NO_2$, which generates when the catalytic ingredient oxidizes $N_2O$ and NO, by the $NO_x$ sorbing member. Thus, the resulting catalytic layer exhibits a furthermore improved $NO_x$ purifying activity. The loading amount of the $NO_x$ sorbing member can preferably fall in a range of from 0.05 to 0.45 mol with respect to 1 L of the wall-flow structure honeycomb substrate. When the loading amount is less than 0.05 mol with respect to 1 L of the wall-flow structure honeycomb substrate, the $NO_x$ purifying activity of the resulting catalytic layers is too low to be practical. When the $NO_x$ purifying member is loaded more than 0.45 mol with respect to 1 L of the wall-flow structure honeycomb substrate, the $NO_x$ purifying member might cover the catalytic ingredient to degrade the purifying activities of the catalytic ingredient.

The catalytic layer can be formed on the wall-flow structure honeycomb substrate in the following manner. An oxide powder or a composite oxide powder is made into a slurry together with a binder component, such as an alumina sol, and water. The resulting slurry is deposited on the cellular walls, and is thereafter calcined. Finally, the catalytic ingredient is loaded on the resulting catalytic layer precursor. Alternatively, the slurry can be prepared from a catalytic powder in which a catalytic ingredient has been loaded on an oxide powder or a composite oxide powder in advance. When the slurry is deposited on the cellular walls, it is possible to use ordinary immersion methods. However, it is desirable not only to forcibly fill the slurry into the pores of the cellular walls but also to remove the slurry, which enters the pores in excess, by air blowing or suction.

At the second catalyst, the catalytic layer can preferably formed in an amount of from 30 to 200 g with respect to 1 L of the wall-flow structure honeycomb substrate. When the catalytic layer is formed in an amount of less than 30 g with respect to 1 L of the wall-flow structure honeycomb structure, it might be inevitable that the durability of the catalytic ingredient or $NO_x$ sorbing member degrades. When the forming amount exceeds 200 g with respect to 1 L of the wall-flow structure honeycomb substrate, the pressure loss exerted by the resulting catalytic layers might be too high to be practical.

The first catalyst, the second catalyst and the third catalyst are disposed in this order from a downstream side of the flow of exhaust gases to an upstream side thereof. They can be disposed at intervals, but can desirably be disposed so as to neighbor with each other in order to suppress the temperature of exhaust gases from lowering. Moreover, a composition ratio of the first catalyst, the second catalyst and the third catalyst can preferably fall in a range that the first catalyst:the second catalyst:the third catalyst=0.2-1:1:0.2-0.8, approvably 0.2-1:1:0.2-0.5, and further preferably in the either range of 0.5-1:1:0.2-0.5, or 0.3-0.5:1:0.6-0.8, by volume.

Note that a liquid reducing agent flows into the third catalyst directly. As a result, there is a case that the vaporization heat of the liquid reducing agent might lower the temperature of exhaust gases so that the catalytic ingredient cannot demonstrate the purifying activities fully. In that case, the loading amount of the catalytic ingredient can be small at the third catalyst, and the volume can be small in the aforementioned composition ratio. On the contrary, the first catalyst is, however, required to sufficiently exhibit the purifying activities. Therefore, the loaded catalytic ingredient is needed to sufficiently demonstrate the purifying activities. Accordingly, it is preferable to make the volume of the first catalyst large in the aforementioned composition ratio and to make the absolute loading amount of the catalytic ingredient large. Namely, the first catalyst can preferably exhibit a loading density of the catalytic ingredient higher than that of the third catalyst. Specifically, the catalytic ingredient loading density at the first catalyst can preferably be greater than that at the third catalyst by a factor of from 1 to 10, further preferably from 1.5 to 6, furthermore preferably from 2 to 4.

On the other hand, the third catalyst can preferably exhibit a loading density of the $NO_x$ sorbing member higher than that of the first catalyst. On an upstream side of the flow of exhaust gases (or at the third catalyst, specifically), it is possible to sufficiently generate active species for oxidizing PMs, such as active oxygen, by enlarging the $NO_x$ sorbing amount, even if the catalytic ingredient does not exhibit the greatest $NO_x$ reducing activity. Moreover, on a downstream side of the flow of exhaust gases (or at the first catalyst, specifically), it is possible to sufficiently reduce $NO_x$, which have passed down to the first catalyst through the upstream-side third and second catalysts or have been sorbed in the first catalyst, by loading the catalytic ingredient more, even if the $NO_x$ sorbing amount is less at the first catalyst. Thus, the overall $NO_x$ and PMs purifying activities are upgraded. Note that the $NO_x$ sorbing member loading density at the third catalyst can preferably be greater than that at the first catalyst by a factor of from 1 to 10, further preferably from 1.5 to 6, furthermore preferably from 2 to 4.

In addition, the first catalyst and the third catalyst can preferably exhibit a catalytic layer coating amount greater than that of the second catalyst. This arrangement is preferable because of the following facts. The larger the coating amount of the second catalyst is, the higher the pressure loss has risen thereat. Hence, it is preferable to gain the coating amount ratio of the straight-flow structure first and third catalysts rather than that of the wall-flow structure second catalyst in order load the catalytic ingredient and $NO_x$ sorbing member more. Note that the catalytic layer coating amount at the first and third catalysts can preferably be greater than that at the second catalyst by a factor of from 1 to 5, further preferably from 1.5 to 4, furthermore preferably from 2 to 3.

The present exhaust gas-purifying apparatus can preferably further comprise an oxidizing catalyst disposed on an upstream side of the flow of exhaust gases with respect to the third catalyst, and the oxidizing catalyst can comprise a straight-flow structure support substrate having cells and cellular walls demarcating the cells, and a catalytic layer formed on a surface of the cellular walls, and including a catalytic ingredient loaded thereon. Thus, a liquid reducing agent is first flowed into the oxidizing catalyst, and is sufficiently gasified, cracked and homogenized by oxidation at the oxidizing catalyst. At the same time, the oxidation reaction increases the temperature of exhaust gases. Therefore, the most upstream-side oxidizing catalyst furthermore promotes the above-described reaction mechanisms at the downstream-side third, second and first catalysts. As result, the present exhaust gas-purifying apparatus can purify HC, CO, $NO_x$ and PMs in exhaust gases even from low temperature regions.

As for the most upstream-side oxidizing catalyst, it is possible to use conventional oxidizing catalysts which comprise a straight-flow structure support substrate, and a catalytic layer formed on a surface of the cellular walls of the support substrate. The catalytic layer comprises at least one oxide powder such as alumina, ceria, zirconia, titania and zeolite, and a catalytic ingredient loaded on the oxide powder. Note that the oxide powder can preferably be formed as a layer in an amount of from 50 to 200 g with respect to 1 L of the straight-flow structure support substrate.

As for the catalytic ingredient included in the most upstream-side oxidizing catalyst, it is possible to use at least one noble metal selected from the group consisting of Pt, Rh and Pd. The catalytic ingredient can preferably be loaded in an amount of from 0.1 to 10 g with respect to 1 L of the straight-flow structure support substrate. Among the noble metals, it is preferable to use Pt whose oxidizing activity is high. Note that, when the exhaust gas-purifying apparatus further comprises the most upstream-side oxidizing catalyst, even if the loading amount of the catalytic ingredient is reduced at the third catalyst, it can demonstrate an overall $NO_x$ sorbing ability equivalent to that exhibited by the exhaust gas-purifying apparatus free of such a reduction of the catalytic ingredient. Therefore, it is possible to almost equalize the entire loading amount of the catalytic ingredient in spite of the exhaust gas-purifying apparatus further comprising the most upstream-side oxidizing catalyst. Thus, it is possible to suppress the material cost from going up.

Moreover, a composition ratio of the most upstream-side oxidizing catalyst and the third catalyst can preferably fall in a such range that the most upstream-side oxidizing catalyst: the third catalyst=0.05-1:1, further preferably 0.3-1:1, furthermore preferably 0.4-0.8:1, by volume.

EXAMPLES

The present exhaust gas-purifying apparatus will be hereinafter described in more detail with reference to specific embodiments and comparative examples.

Example No. 1

Figure 2:
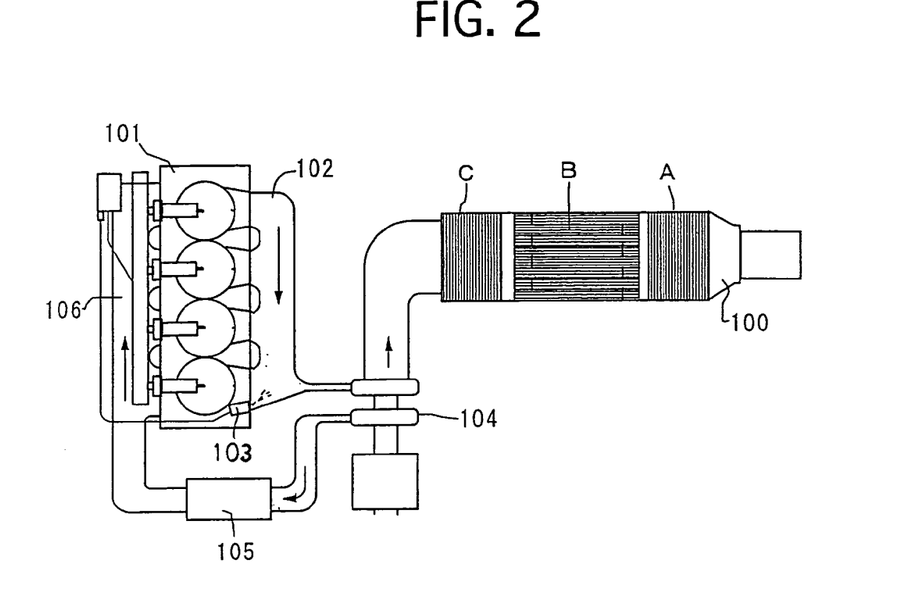
FIG. 2 is an explanatory diagram for illustrating an exhaust gas-purifying apparatus according to Example No. 1 of the present invention.

FIG. 2 illustrates an exhaust gas-purifying apparatus according to Example No. 1 of the present invention. The exhaust gas-purifying apparatus comprises a first catalyst "A," a second catalyst "B" and a third catalyst "C" which neighbor with each other and which are disposed in a catalytic converter 100 in this order from the downstream side of the flow of exhaust gases to the upstream side thereof. The catalytic converter 100 is connected with an exhaust manifold 102 of a diesel engine 101 at the inlet end. Moreover, an injection nozzle 103, which is disposed in the exhaust manifold 102, supplies light oil into exhaust gases intermittently. Note that a part of the exhaust gases coming from the exhaust manifold 102 is returned to an intake manifold 106 of the diesel engine 101 by way of a turbocharger 104 and an intercooler 105.

Hereinafter, the production processes of the first catalyst "A," the second catalyst "B" and the third catalyst "C" will be described instead of describing the arrangement of the exhaust gas-purifying apparatus according to Example No. 1.

Preparation of First Catalyst "A"

A straight-flow structure honeycomb substrate was prepared. The straight-flow structure honeycomb substrate was made of cordierite, comprised cells in a quantity of 400 cells/inch$^2$ (i.e., 62 cells/cm$^2$) and cellular walls whose thickness was 0.1 mm, and had a volume of 1 L.

Next, a mixture slurry was prepared in which an alumina powder, a titania powder, a zirconia powder and a ceria powder were dispersed in water. The mixture slurry was coated on a surface of the cellular walls in the straight-flow structure honeycomb substrate by a wash coating method to form a coating layer in an amount of 270 g with respect to 1 L of the straight-flow structure honeycomb substrate. Subsequently, Pt was loaded on the coating layer by a water absorption loading method in an amount of 3 g with respect to 1 L of the straight-flow structure honeycomb substrate, and the coating layer was calcined. Thereafter, Li, Ba and K were further loaded on the coating layer by a water absorption loading method in an amount of 0.2 mol, 0.1 mol and 0.1 mol, respectively, with respect to 1 L of the straight-flow structure honeycomb substrate, and the coating layer was further calcined at 500° C. Thus, the first catalyst "A" was prepared.

Preparation of Second Catalyst "B"

A wall-flow structure honeycomb substrate was prepared. The wall-flow structure honeycomb substrate was made of cordierite, comprised cells in a quantity of 300 cells/inch$^2$ (i.e., 46.5 cells/cm$^2$) and cellular walls whose thickness was 0.3 mm, and had a volume of 2 L. Moreover, the wall-flow structure honeycomb substrate was clogged alternately at every other cell in the opposite end surfaces.

Then, with the same mixture slurry used in the preparation of the first catalyst "A," a coating layer was formed on a surface of the cellular walls and on a surface of the inner pores in the cellular walls in an amount of 150 g with respect to 1 L of the wall-flow structure honeycomb substrate. Thereafter, Pt was loaded on the coating layer by a water absorption loading method in an amount of 2 g with respect to 1 L of the wall-flow structure honeycomb substrate, and the coating layer was calcined. Moreover, Li, Ba and K were further loaded on the coating layer by a water absorption loading method in an amount of 0.3 mol, 0.05 mol and 0.025 mol, respectively, with respect to 1 L of the wall-flow structure honeycomb substrate, and the coating layer was further calcined at 500° C. Thus, the second catalyst "B" was prepared.

Preparation of Third Catalyst "C"

The same catalyst as the first catalyst "A" was prepared, and was labeled a third catalyst "C."

Test

The first catalyst "A," the second catalyst "B" and the third catalyst "C" were disposed in the catalytic converter 100 in a neighboring manner in this order from the downstream side of the flow of exhaust gases to the upstream side thereof. The resulting catalyst assembly was labeled an exhaust gas-purifying apparatus according to Example No. 1 of the present invention. First of all, the catalyst assembly was subjected to a durability test in which 650° C. exhaust gases were distributed for 50 hours. Thereafter, the diesel engine 1 was driven at a revolution speed of 2,900 rpm, the temperature of exhaust gases flowing into the third catalyst "C" was set at 300° C., and light oil was injected into the exhaust gases for 0.1 second intermittently at intervals of 10 seconds. Note that the light-oil injection rate was controlled so that the exhaust gases were turned into a fuel-rich atmosphere exhaust gas equivalent to that produced by burning an air-fuel mixture whose air-fuel ratio A/F was 14.2.

Figure 4:
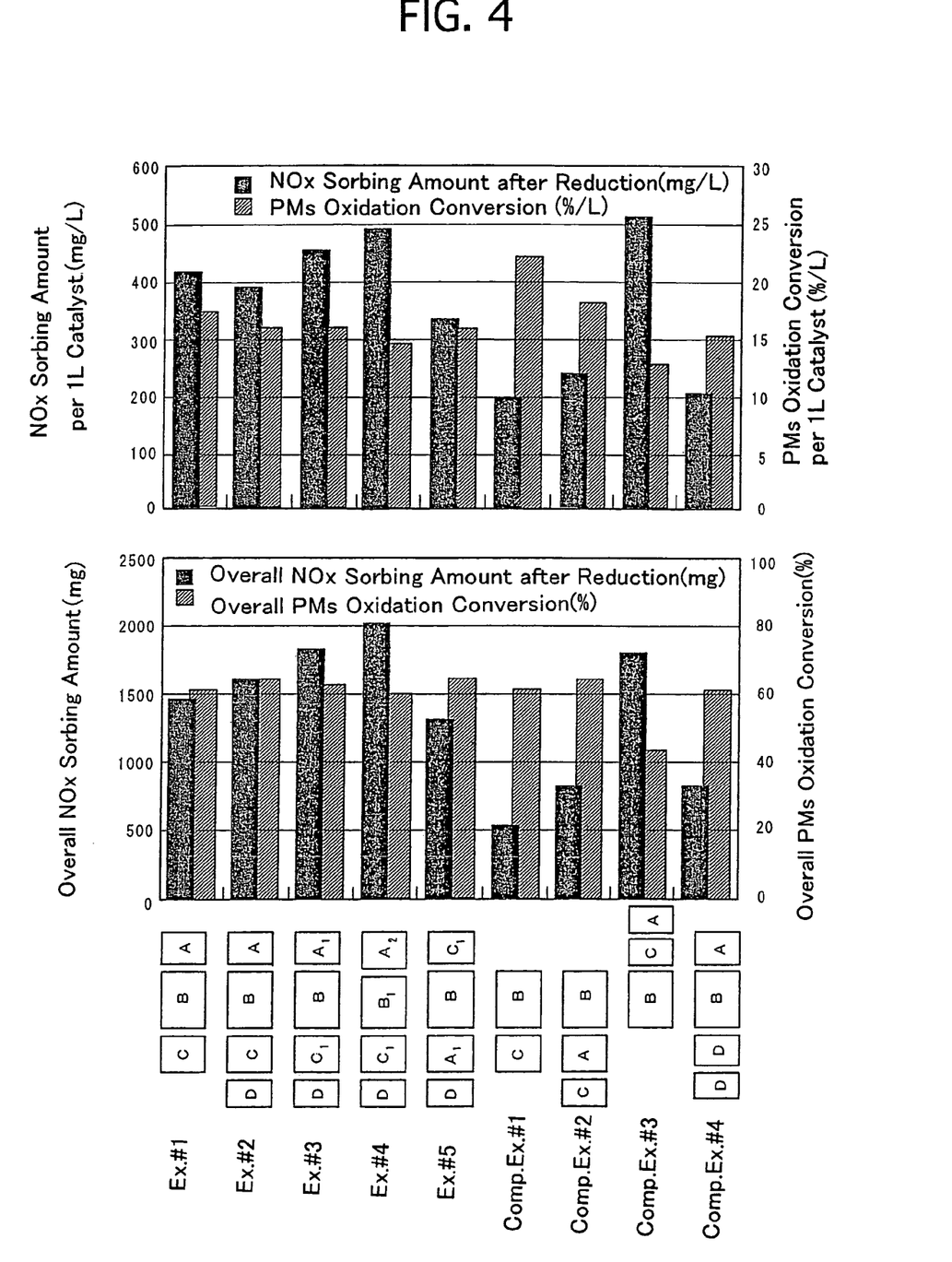
FIG. 4 is graphs for illustrating the $NO_x$ sorbing amounts and PMs oxidation conversions which were exhibited by exhaust gas-purifying apparatuses according to Example Nos. 1 through 5 of the present invention as well as Comparative Example Nos. 1 through 4.

Under the above-described conditions, the $NO_x$ conversion and HC emission peak concentration exhibited by the exhaust gas-purifying apparatus according to Example No. 1 were measured continuously. The injection of the light oil was turned off at a time when the $NO_x$ conversion stabilized. Thereafter, the $NO_x$ sorbing amount exhibited by the exhaust gas-purifying apparatus according to Example No. 1 was measured. Moreover, the exhaust gas-purifying apparatus according to Example No. 1 was weighed before and after the test. Then, the PMs oxidation conversion was calculated from the weight difference and the blank value of PMs content in the exhaust gases. FIG. 4 illustrates the results of the measurements.

Example No. 2

Figure 3:
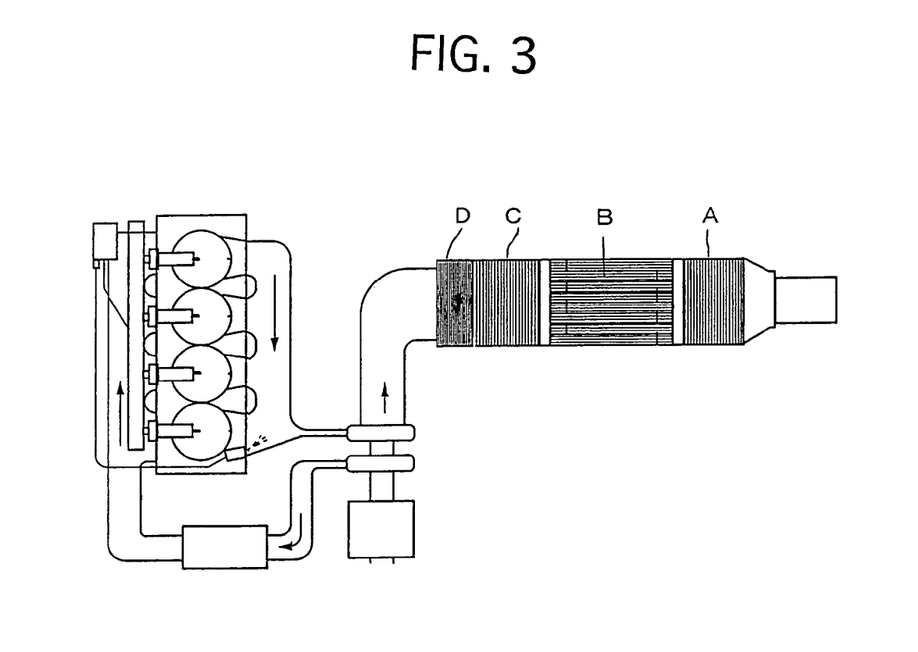
FIG. 3 is an explanatory diagram for illustrating an exhaust gas-purifying apparatus according to Example No. 2 of the present invention.

FIG. 3 illustrates an exhaust gas-purifying apparatus according to Example No. 2 of the present invention. Except that an oxidizing catalyst "D" was further disposed on an upstream side of the flow of exhaust gases with respect to the third catalyst "C," the exhaust gas-purifying apparatus according to Example No. 2 was identical with that according to Example No. 1.

The oxidizing catalyst "D" comprised a coating layer, and Pt loaded on the coating layer. With a mixture slurry of alumina, titania and zeolite, a coating layer was formed in an amount 160 g with respect to 1 L of a straight-flow structure honeycomb substrate. The straight-flow structure honeycomb substrate used herein was identical with that of the first catalyst "A" in Example No. 1, except that its length was reduced by half of that of the first catalyst "A" in Example No. 1. That is, the used straight-flow structure honeycomb substrate had a volume of 0.5 L. The Pt was loaded uniformly on the coating layer in an amount of 3 g with respect to 1 L of the used straight-flow structure honeycomb substrate.

The exhaust gas-purifying apparatus according to Example No. 2 was tested in the same manner as described in Example No. 1. FIG. 4 illustrates the test results as well.

Example No. 3

Except the following features, an exhaust gas-purifying apparatus according to Example No. 3 of the present invention had the same arrangements as those of Example No. 2. Namely, the Pt loading amount in the third catalyst "C" in Example No. 1 was reduced to 2 g with respect to 1 L of the straight-flow structure honeycomb substrate; the Li and Ba loading amounts therein were increased to 0.3 mol and 0.15 mol, respectively, with respect thereto; and the resulting catalyst was labeled a third catalyst "$C_1$." Moreover, the Pt loading amount in the first catalyst "A" in Example No. 1 was increased to 4 g with respect to 1 L of the straight-flow structure honeycomb substrate; the Ba and K loading amounts therein were reduced to 0.05 mol, respectively, with respect thereto; and the resultant catalyst was labeled a first catalyst "$A_1$."

The exhaust gas-purifying apparatus according to Example No. 3 was tested in the same manner as described in Example No. 1. FIG. 4 illustrates the test results as well.

Example No. 4

Except the following features, an exhaust gas-purifying apparatus according to Example No. 4 of the present invention had the same arrangements as those of Example No. 3. Namely, the length of the wall-flow structure honeycomb substrate used in the second catalyst "B" in Example No. 1 was reduced by a factor ¾, that is, the used wall-flow structure honeycomb structure had a volume of 1.5 L; the coating layer was formed in an amount of 75 g with respect to 1 L of the used wall-flow structure honeycomb substrate; and the resulting catalyst was labeled a second catalyst "$B_1$." Moreover, the length of the straight-flow structure honeycomb substrate used in the first catalyst "A" in Example No. 1 was enlarged by a factor 3/2, that is, the used straight-flow structure honeycomb substrate had a volume of 1.5 L; the Pt loading amount in the first catalyst "A" in Example No. 1 was increased to 3.3 g with respect to 1 L of the used straight-flow structure honeycomb substrate; and the resultant catalyst was labeled a first catalyst "$A_2$." Note that the total Pt loading amount in the exhaust gas-purifying apparatus according to Example No. 4 was identical with that in the exhaust gas-purifying apparatus according to No. 3.

The exhaust gas-purifying apparatus according to Example No. 4 was tested in the same manner as described in Example No. 1. FIG. 4 illustrates the test results as well.

Example No. 5

Except the following features, an exhaust gas-purifying apparatus according to Example No. 5 of the present invention had the same arrangements as those of Example No. 3. The first catalyst "$A_1$" and the third catalyst "$C_1$" were interchanged so that the third catalyst "$C_1$," the second catalyst "B," the first catalyst "$A_1$" and the oxidizing catalyst "D" were disposed in this order from the downstream side of the flow of exhaust gases to the upstream side thereof.

The exhaust gas-purifying apparatus according to Example No. 5 was tested in the same manner as described in Example No. 1. FIG. 4 illustrates the test results as well.

Comparative Example No. 1

Except that the first catalyst "A" was not used, an exhaust gas-purifying apparatus according to Comparative Example No. 1 had the same arrangements as those of Example No. 1.

The exhaust gas-purifying apparatus according to Comparative Example No. 1 was tested in the same manner as described in Example No. 1. FIG. 4 illustrates the test results as well.

Comparative Example No. 2

In an exhaust gas-purifying apparatus according to Comparative Example No. 2, the same third catalyst "C" as used in Example No. 2 was disposed on the most upstream side of the flow of exhaust gases; the same first catalyst "A" as used in Example No. 1 was disposed on a downstream side with respect to the third catalyst "C"; and the same second catalyst "B" as used in Example No. 1 was disposed on a downstream side with respect to the first catalyst "A".

The exhaust gas-purifying apparatus according to Comparative Example No. 2 was tested in the same manner as described in Example No. 1. FIG. 4 illustrates the test results as well.

Comparative Example No. 3

In an exhaust gas-purifying apparatus according to Comparative Example No. 3, the same second catalyst "B" as used in Example No. 1 was disposed on the most upstream side of the flow of exhaust gases; the same third catalyst "C" as used in Example No. 1 was disposed on a downstream side with respect to the second catalyst "B"; and the same first catalyst "A" as used in Example No. 1 was disposed on a downstream side with respect to the third catalyst "C".

The exhaust gas-purifying apparatus according to Comparative Example No. 3 was tested in the same manner as described in Example No. 1. FIG. 4 illustrates the test results as well.

Comparative Example No. 4

Except that the same oxidizing catalyst "D" as used in Example No. 2 was disposed in a quantity of two in series on the most upstream side of the flow of exhaust gases instead of the third catalyst "C," an exhaust gas-purifying apparatus according to Comparative Example No. 4 had the same arrangements as those of Example No. 1.

The exhaust gas-purifying apparatus according to Comparative Example No. 4 was tested in the same manner as described in Example No. 1. FIG. 4 illustrates the test results as well.

TABLE 1

| | | | | Exhaust Gas Flow Upstream Side<------>Exahust Gas Flow Downstream Side | | | | | | | | | | | | | |
|---|---|---|---|---|---|---|---|---|---|---|---|---|---|---|---|---|---|
| | | | | | *3 | | | | | *3 | | | | | *3 | | |
| | | *1 | *2 | Li | Ba | K | *1 | *2 | Li | Ba | K | *1 | *2 | Li | Ba | K | |
| *6 | 1 | 1 C | 3 | 0.2 | 0.1 | 0.1 | 2 B | 2 | 0.3 | 0.05 | 0.025 | 1 A | 3 | 0.2 | 0.1 | 0.1 | |
| | 2 | 0.5 D | 3 | None | None | None | 1 C | 3 | 0.2 | 0.1 | 0.1 | 2 B | 2 | 0.3 | 0.05 | 0.025 | |
| | 3 | 0.5 D | 3 | None | None | None | 1 $C_1$ | 2 | 0.3 | 0.15 | 0.1 | 2 B | 2 | 0.3 | 0.05 | 0.025 | |
| | 4 | 0.5 D | 3 | None | None | None | 1 $C_1$ | 2 | 0.3 | 0.15 | 0.1 | 1.5 $B_1$ | 2 | 0.3 | 0.05 | 0.025 | |
| | 5 | 0.5 D | 3 | None | None | None | 1 $A_1$ | 4 | 0.2 | 0.05 | 0.05 | 2 B | 2 | 0.3 | 0.05 | 0.02 | |
| *7 | 1 | 1 C | 3 | 0.2 | 0.1 | 0.1 | 2 B | 2 | 0.3 | 0.05 | 0.025 | None None | None | None | None | None | |
| | 2 | 1 C | 3 | 0.2 | 0.1 | 0.1 | 1 A | 3 | 0.2 | 0.1 | 0.1 | 2 B | 2 | 0.3 | 0.05 | 0.025 | |
| | 3 | 2 C | 2 | 0.3 | 0.05 | 0.025 | 1 C | 3 | 0.2 | 0.1 | 0.1 | 1 A | 3 | 0.2 | 0.1 | 0.1 | |
| | 4 | 0.5 D | 3 | None | None | None | 0.5 D | 3 | None | None | None | 2 B | 2 | 0.3 | 0.05 | 0.025 | |

| | | | | Exhaust Gas Flow Upstream Side<------>Exahust Gas Flow Downstream Side | | | | | |
|---|---|---|---|---|---|---|---|---|---|
| | | | | | *3 | | | | |
| | | *1 | *2 | Li | Ba | K | *4 | *5 | |
| *6 | 1 | None None | None | None | None | None | 2.50 | 0.388 | |
| | 2 | 1 A | 3 | 0.2 | 0.1 | 0.1 | 2.56 | 0.344 | |
| | 3 | 1 $A_1$ | 4 | 0.2 | 0.05 | 0.05 | 2.56 | 0.356 | |
| | 4 | 1.5 $A_2$ | 3.3 | 0.3 | 0.05 | 0.05 | 2.56 | 0.347 | |
| | 5 | 1 $C_1$ | 2 | 0.3 | 0.15 | 0.1 | 2.56 | 0.356 | |

TABLE 1-continued

| *7 | | | | | | | | |
|---|---|---|---|---|---|---|---|---|
| | 1 | None None | None | None | None | None | 2.33 | 0.383 |
| | 2 | None None | None | None | None | None | 2.50 | 0.388 |
| | 3 | None None | None | None | None | None | 2.50 | 0.388 |
| | 4 | 1 A | 3 | 0.2 | 0.1 | 0.1 | 2.50 | 0.288 |

Note:
*1 specifies "Volume (L)."
*2 specifies "Pt Loading Amount (g/L)."
*3 specifies "$NO_x$ Sorbing Member Loading Amount (mol/L)."
*4 specifies "Overall Pt Loading Amount (g/L)."
*5 specifies "Overall (Li + Ba + K) (mol/L)."
*6 specifies "Example No."
*7 specifies "Comp. Ex. No."

Evaluation

Table 1 and FIG. 4 summarize the arrangements of the exhaust gas-purifying apparatuses according to Example Nos. 1 through 5 as well as Comparative Example Nos. 1 through 4. Moreover, FIG. 4 shows the $NO_x$ sorbing amounts and PM oxidation conversions, which were measured as described above but are converted into those values for 1 L equivalent catalysts, as well.

From FIG. 4, it is seen that the exhaust gas-purifying apparatuses according Example Nos. 1 through 5 exhibited a high $NO_x$ sorbing amount and PMs oxidation conversion. Although the exhaust gas-purifying apparatuses according Comparative Example Nos. 1, 2 and 4 exhibited a high PMs oxidation conversion, they exhibited a low $NO_x$ sorbing amount. On the other hand, although the exhaust gas-purifying apparatus according Comparative Example No. 3 exhibited a high $NO_x$ sorbing amount, it exhibited a low PMs oxidation conversion.

When comparing the results exhibited by Example No. 1 with those exhibited by Example Nos. 2 through 4, it is understood that it is preferable as well to dispose the oxidizing catalyst "D" on the most upstream side of the flow of exhaust gases. That is, when the oxidizing catalyst "D" is disposed on the most upstream side of the flow of exhaust gases, the exhaust gas-purifying apparatuses according to Example Nos. 2 through 4 exhibited an enlarged overall $NO_x$ sorbing amount, compared with that according to Example No. 1 exhibited.

Note that, in the exhaust gas-purifying apparatus according to Example No. 3, the Pt loading amount was reduced at the third catalyst "$C_1$," but was increased at the first catalyst "$A_1$" so that the overall Pt loading amount was equal to that in the exhaust gas-purifying apparatus according to Example No. 2. Regardless of the arrangement, the exhaust gas-purifying apparatus according to Example No. 3 exhibited an enlarged $NO_x$ sorbing amount, compared with that exhibited by the exhaust gas-purifying apparatus according to Example No. 2. In other words, the Pt loaded on the first catalyst contributes more to improving the $NO_x$ purifying activity than the Pt loaded on the third catalyst does. Moreover, when the Pt loading amount is increased at the first catalyst, the first catalyst is improved in terms of the recoverability from sulfur poisoning.

On the contrary, in the exhaust gas-purifying apparatus according to Example No. 5, the Pt loading amount was increased at the third catalyst "$C_1$," but was decreased at the first catalyst "$A_1$." As a result, the exhaust gas-purifying apparatus according to Example No. 5 exhibited $NO_x$ sorbing amounts lower than that according to Example No. 2 did. Thus, the observed result supports the above-described advantages.

From the results exhibited by the exhaust gas-purifying apparatus according to Example No. 4, it is appreciated that the enlarged volume of the first catalyst "$A_1$" upgraded the $NO_x$ sorbing ability more than that exhibited by the exhaust gas-purifying apparatus according to Example No. 3. Moreover, when the volume of the second catalyst "$B_1$" was reduced, the pressure loss increased. However, it has been apparent that the incremental degree of the pressure loss is kept to be less by reducing the coating amount at the second catalyst when the PMs deposition amount is less. In addition, when the coating amount was reduced at the second catalyst "$B_1$," the durability of the $NO_x$ purifying ability degraded. However, the exhaust gas-purifying apparatus according to Example No. 4 produced a high $NO_x$ purifying ability as a whole, because the advantage effected by the volume enlargement at the first catalyst "$A_1$" surpassed the disadvantage effected by the coating amount reduction at the second catalyst "$B_1$."

Having now fully described the present invention, it will be apparent to one of ordinary skill in the art that many changes and modifications can be made thereto without departing from the spirit or scope of the present invention as set forth herein including the appended claims.

What is claimed is:

1. An exhaust gas-purifying apparatus, comprising:
an $NO_x$ sorbing-and-reducing first catalyst disposed on a downstream side of an exhaust manifold of an engine, said exhaust manifold carrying exhaust gases away from the engine, said first catalyst, comprising
a straight-flow structure support substrate having cells and cellular walls demarcating the cells, and
a catalytic layer formed on a surface of the cellular walls, and including a catalytic ingredient and an $NO_x$ sorbing member loaded thereon;
a second catalyst disposed on an upstream side of the exhaust gases with respect to the first catalyst, comprising
a wall-flow structure honeycomb substrate having
inlet cells clogged on a downstream side of the flow of the exhaust gases,
outlet cells neighboring the inlet cells, and clogged on an upstream side of the flow of the exhaust gases, and
porous cellular walls demarcating the inlet cells and the outlet cells and having pores, and a catalytic layer formed on a surface of the cellular walls and an inner surface of the pores of the second catalyst, and including an oxide support and a catalytic ingredient loaded on the oxide support;

an $NO_x$ sorbing-and-reducing third catalyst disposed on an upstream side of the exhaust gases with respect to the second catalyst, comprising a straight-flow structure support substrate having cells and cellular walls demarcating the cells, and a catalytic layer formed on a surface of the cellular walls and including a catalytic ingredient and an $NO_x$ sorbing member loaded thereon; and a fuel injector intermittently supplying a liquid reducing agent directly into said third catalyst;

wherein the second catalyst further comprises an NOx sorbing member loaded on the catalytic layer; and wherein the first catalyst exhibits a loading density of the catalytic ingredient higher than that of the third catalyst.

2. The exhaust gas-purifying apparatus set forth in claim 1 further comprising an oxidizing catalyst comprising a straight-flow structure support substrate having cells and cellular walls demarcating the cells, and a catalytic layer formed on a surface of the cellular walls and including a catalytic ingredient loaded thereon, wherein the oxidizing catalyst is disposed on an upstream side of the flow of the exhaust gases with respect to the third catalyst.

3. The exhaust gas-purifying apparatus set forth in claim 1, wherein the third catalyst exhibits a loading density of the $NO_x$ sorbing member higher than that of the first catalyst.

4. The exhaust gas-purifying apparatus set forth in claim 1, wherein the first catalyst and the third catalyst exhibit a catalytic layer coating amount greater than that of the second catalyst.

5. The exhaust gas-purifying apparatus set forth in claim 1, wherein a composition ratio of the first catalyst, the second catalyst and the third catalyst falls in a range that the first catalyst:the second catalyst:the third catalyst=0.2-1:1:0.2-0.8 by volume.

6. The exhaust gas-purifying apparatus set forth in claim 2, wherein a composition ratio of the oxidizing catalyst and the third catalyst falls in a range that the oxidizing catalyst: the third catalyst=0.05-1:1 by volume.

* * * * *

UNITED STATES PATENT AND TRADEMARK OFFICE
CERTIFICATE OF CORRECTION

PATENT NO. : 7,560,079 B2  
APPLICATION NO. : 10/922948  
DATED : July 14, 2009  
INVENTOR(S) : Seiji Okawara

Page 1 of 1

It is certified that error appears in the above-identified patent and that said Letters Patent is hereby corrected as shown below:

In claim 1, column 17, line 15, "NOx;" should read --$NO_x$--.

Signed and Sealed this

Thirteenth Day of October, 2009

David J. Kappos  
*Director of the United States Patent and Trademark Office*